United States Patent

Russum

[11] Patent Number: 5,813,809
[45] Date of Patent: Sep. 29, 1998

[54] POLYMERIC INSERT WITH CRUSH-FORMED THREADS FOR MATING WITH THREADED SURFACE

[75] Inventor: William C. Russum, Tucson, Ariz.

[73] Assignee: Wyko Corporation, Tucson, Ariz.

[21] Appl. No.: 847,823

[22] Filed: Apr. 28, 1997

[51] Int. Cl.⁶ .............................. F16B 37/16; B25G 3/02
[52] U.S. Cl. ..................... 411/437; 411/302; 411/393; 403/362
[58] Field of Search .................................. 411/302, 304, 411/301, 437, 393, 324, 907; 403/362; 249/59

[56] References Cited

U.S. PATENT DOCUMENTS

| | | | |
|---|---|---|---|
| 3,743,333 | 7/1973 | Kosinski | 403/362 |
| 4,094,330 | 6/1978 | Jong | 403/362 |
| 4,436,468 | 3/1984 | Ozaki | 411/304 |
| 4,645,395 | 2/1987 | Lundgren | 411/304 |

FOREIGN PATENT DOCUMENTS 2135175  2/1972  Germany ............................ 411/301

*Primary Examiner*—Flemming Saether
*Attorney, Agent, or Firm*—Antonio R. Durando

[57] ABSTRACT

A threaded connection between adjoining male/female surfaces is produced by mating a plastic insert embedded in one surface with threads machined on the other surface. The plastic insert is pressed against the machined threads and deformed to provide conforming meshing threads in the insert, thereby producing a threaded engagement between the two surfaces. Preferably, the insert is sufficiently wide to overlap multiple machined threads and yield a stable, strip-resistant engagement. By providing at least three such inserts evenly distributed around the preexisting threads, an axially stable, screwable threaded connection is produced between the two surfaces that does not require precise machining or special tooling for unconventional threads. Although the inserts are preferably used in the female surface for ease of access, they can be used advantageously in equivalent fashion in the male surface of the screwable threaded connection.

12 Claims, 5 Drawing Sheets

POLYMERIC INSERT WITH CRUSH-FORMED THREADS FOR MATING WITH THREADED SURFACE

BACKGROUND OF THE INVENTION

1. Field of the Invention

This invention is related in general to the field of optical devices and threaded connections between concentric structural sleeves in microscope objectives. In particular, the invention concerns a method and apparatus for creating a threaded connection between two adjoining surfaces.

2. Description of the Related Art

Optical devices utilize microscope objectives for focusing a beam of light on a sample surface. The objective includes separate optical components housed in fixed and movable portions of its structure such that the focal length of the device can be adjusted to focus the light as desired. Typically, the fixed and movable portions of the objective consist of concentric sleeves coupled by very fine threads adapted to provide very gradual translation of the movable portion with respect to the fixed portion along the optical axis of the microscope. The pitch, geometry and density of the threads are selected according to the degree of precision required for the particular application, but are always very fine and precisely machined in order to achieve the accuracy required for optical applications.

As illustrated in the interferometric objective 10 shown in FIG. 1, a typical configuration involves a male, inner sleeve 12 threaded on an outside surface 14 and a mating female, outer sleeve 16 correspondingly threaded on an inside surface 18. The mating threads 20 must be machined precisely on both surfaces within very strict tolerances to ensure a smooth motion of the outer sleeve 16 along the device's optical axis A1 as the movable sleeve 16 is rotated with respect to the fixed sleeve 12 (or vice versa). In addition, because different threads may be optimal for different applications, non-standard pitch, pitch diameter, root diameter, outside diameter, and thread section are normally used at great production costs. Moreover, it is very difficult to fabricate such nearly-perfectly matching, extremely fine male and female threaded connections for optical devices.

Therefore, there still is a need for a versatile and economical kind of threaded connection that is suitable for custom applications such as typically encountered in optical devices. This invention is directed at providing a solution to this problem.

BRIEF SUMMARY OF THE INVENTION

One primary object of this invention is a method of fabrication of a threaded connection that facilitates the problem of matching and ensuring nearly perfect mating of very fine male and female threads.

Another object of the invention is a method of fabrication of universal application, such that it can be utilized for producing threaded connections of any kind of pitch, pitch diameter, root diameter, outside diameter, and thread section.

Another object of the invention is a method and apparatus that are particularly suitable for implementation in conventional interferometric objectives.

Still another goal is a method and apparatus that can be directly incorporation within existing instruments.

Another important goal is a structural configuration of the invention that can be implemented easily and economically according to the above stated criteria.

Therefore, according to these and other objects, the present invention consists of producing a threaded connection between adjoining male/female surfaces by mating a plastic insert embedded in one surface with threads machined on the other surface. The plastic insert is pressed against the machined threads and deformed to provide conforming meshing threads in the insert, thereby producing a threaded engagement between the two surfaces. Preferably, the insert is sufficiently wide to overlap multiple machined threads and yield a stable, strip-resistant engagement. By providing at least three such inserts evenly distributed around the preexisting threads, a screwable threaded connection is produced between the two surfaces that does not require precise machining or special tooling for unconventional threads. Although the inserts are preferably used in the female surface for ease of access, they can be used advantageously in equivalent fashion in the male surface of the screwable threaded connection.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of the present invention lies in the concept of producing perfectly matching male/female threaded connections by first machining one and then forming the other by compressing a deformable structure against it, thereby avoiding the problem of producing mating threads independently. Based on this principle, the invention is described in terms of a typical threaded connection between an inner cylindrical male sleeve and an outer cylindrical female sleeve, such as members 12 and 16 in FIG. 1.

Figure 2:
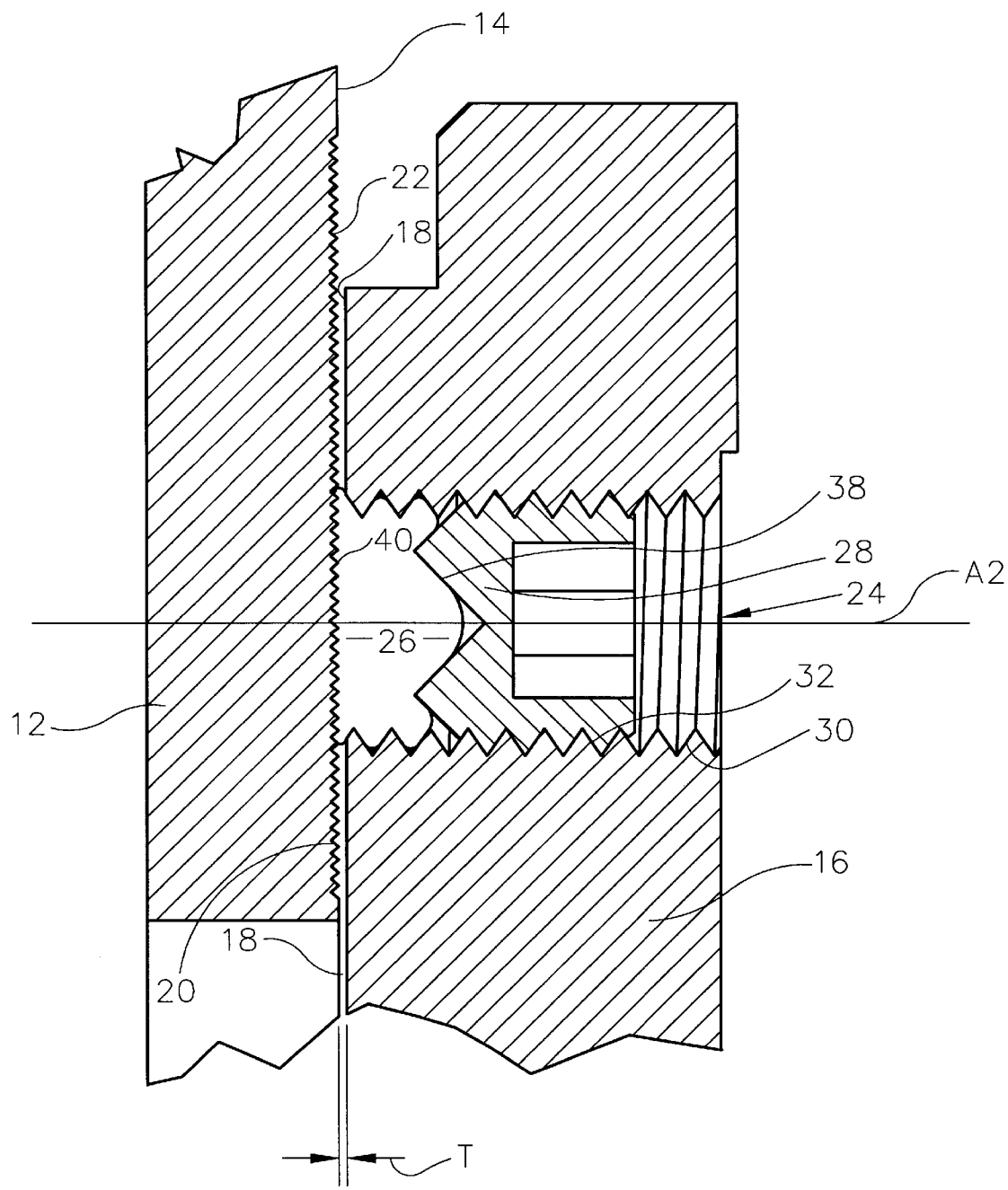
FIG. 2 is a schematic partially-sectioned view of a threaded connection between two adjoining surfaces according to the present invention.

Referring to the drawings, wherein like parts are designated throughout with like numerals and symbols, FIG. 2 illustrates in schematic partially-sectioned view a threaded connection between two adjoining surfaces according to the present invention. The outer surface 14 of the male sleeve 12 includes threads 20 machined or otherwise formed thereon by conventional fabrication processes. The terms "machined" and "formed", as used herein with respect to preexisting threads 20, are intended to refer to preexisting threads produced on a surface by any known process, such as casting, molding, pressing, cutting, etching, etcetera. According to one aspect of the invention, the inner surface 18 of the female sleeve 16 is not threaded, thereby simplifying its process of manufacture. Rather, the diameter of the cylindrical cavity defined by the surface 18 is sized so that the gap T between the crest 22 of the threads 20 and the surface 18 (the annular clearance between the two) is very small when the two sleeves 12 and 16 are disposed concentrically. Ideally, the crest-to-crest diameter of the sleeve 12 should be only sufficiently smaller than the diameter of the surface 18 to permit its play-free but easy coupling. In practice, for example, a maximum tolerance T of 2–6 thousands of an inch for surfaces 14,18 having a diameter of about 1.0–1.5 inches is desirable to account for imperfections in the adjoining structures.

Figure 3:
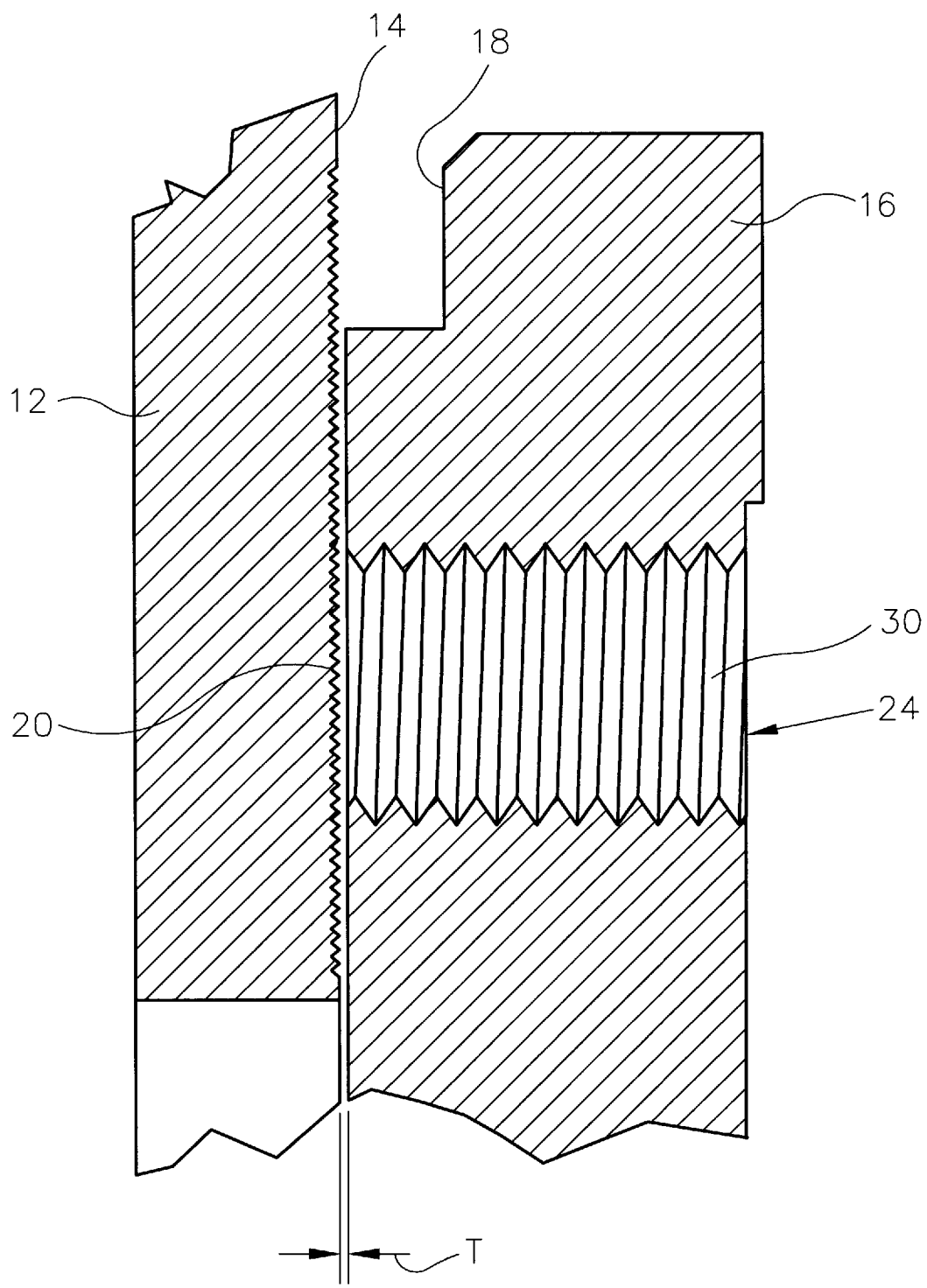
FIG. 3 is a schematic cross-sectional view of the male/female adjoining surfaces of FIG. 2 illustrating the radial opening for housing the insert of the invention.
Figure 4:
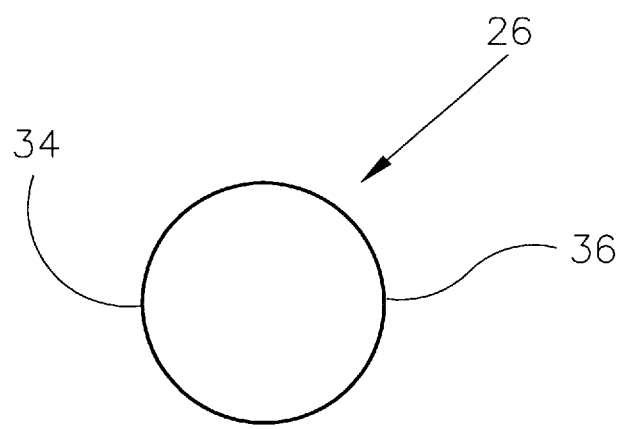
FIG. 4 is a view of a plastic insert according to the invention prior to deformation to produce female threads for mating with corresponding male threads.
Figure 5:
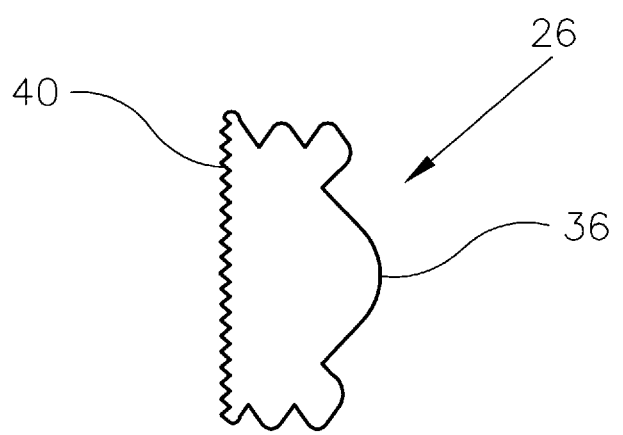
FIG. 5 is a view of the plastic insert of FIG. 4 after deformation to produce female threads for connection as illustrated in FIG. 2.

According to another aspect of the invention better seen in FIG. 3, the female sleeve 16 is provided with substantially-cylindrical radial openings or bores 24 (only one is shown in the figure) adapted to receive a plastic insert 26 and a set screw 28. A conventional screwable connection between female threads 30 in the surface of the opening 24 and mating male threads 32 in the set screw 28 permits the adjustment of its position along the longitudinal axis A2 of the opening 24 (radially with respect to the sleeves 12 and 16). As illustrated in FIG. 4, the insert 26 consists of a ball or pellet adapted to fit snugly within the radial opening 24 of the female sleeve 16. The insert 26 includes a deformable inner surface 34, intended for engagement with the male threads 20 of the sleeve 12, and an outer surface 36, preferably also deformable, for engagement with the tip 38 of the set screw 28. The surface 34 must be sufficiently plastic to make it possible to mold it to conform to the threads 20 and form correspondingly mating threads 40 (seen in FIGS. 2 and 5) when compressed by the set screw 28. At the same time, the material of the insert 26 must be sufficiently stiff and rigid to provide the axial support required for the application and to retain the threads so formed after the pressure from the set screw 28 is released to allow sliding between the two sets of threads. Additionally, the material must have as low a coefficient of friction as possible to ensure the smooth sliding of the female threads 40 with respect to the male threads 20 as one sleeve is rotated (screwed or unscrewed) to shift its axial position with respect to the other. I found that polymeric material such as polytetrafluoroethane (PTFE, also known commercially under the registered trademark TEFLON®), is very good and therefore preferred for optical instrument applications where the preexisting threads 20 are normally made of brass or aluminum material.

Figure 1:
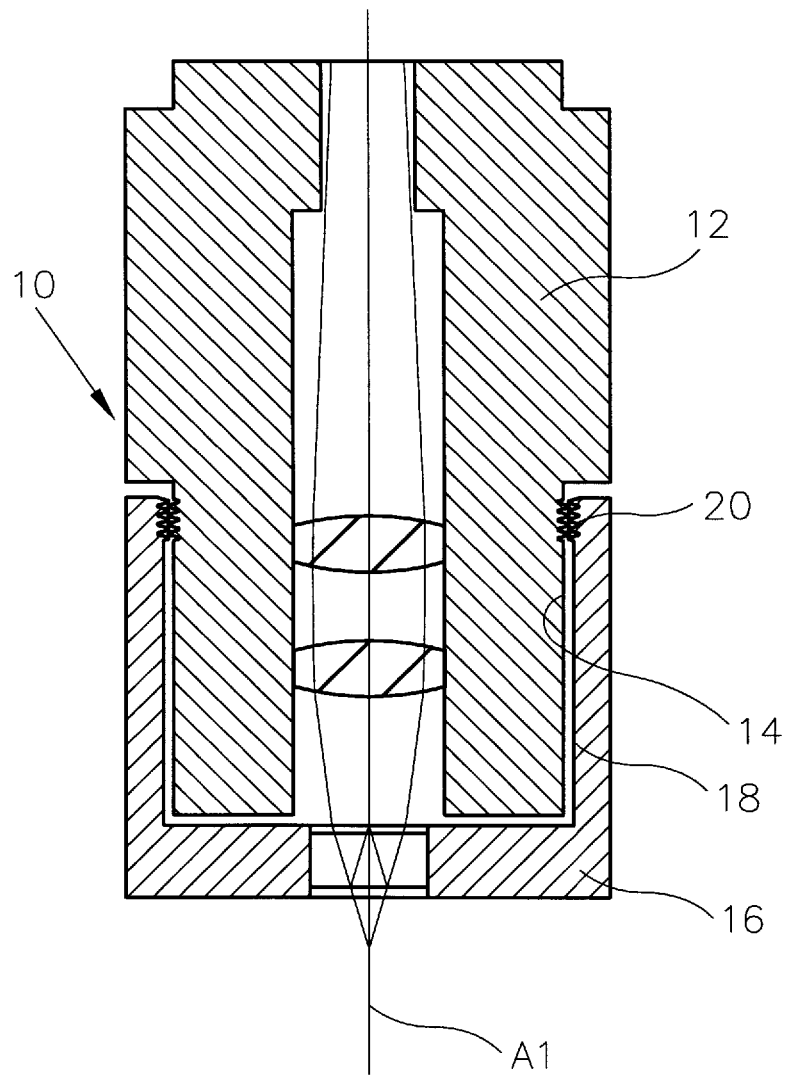
FIG. 1 is a simplified schematic representation of an interferometric microscope objective according to the prior art.

Using the interferometric microscope objective 10 of FIG. 1 as a vehicle to describe the preferred embodiment of the invention, at least three evenly spaced openings 24 are drilled radially in the female sleeve 16 and threaded to receive conforming set screws 28. A Teflon® pellet 26 is inserted in each opening and pushed to contact the threads 20 in the male sleeve 12. Then a set screw 28 is introduced in each opening 24 and tightened to compress the insert 26 against the preexisting male threads 20 and force the abutting surface 34 (FIG. 4) to conform to the threads' geometry, as seen in FIG. 2. Initially, the insert is crushed with the maximum force necessary to form mating threads 40 (FIG. 5) without damaging the structure of the newly formed threads, which is achieved by preloading the set screw 28 to a desired maximum thread-interference preload setting previously determined by empirical methods. For example, a crush preload setting of 4,300 pounds/square-inch was found to be optimal for Teflon® pellets or balls. Once the threads 40 are formed, the set screw 28 is partially backed off to a working load setting, such as 54 pounds/square-inch for Teflon®, to release the pressure and facilitate the sliding interaction between the threads 20 and 40. The resulting structure is a threaded connection between male and female sleeves 12,16 with perfectly mating threads irrespective of their geometry, density and fine pitch.

Figure 6:
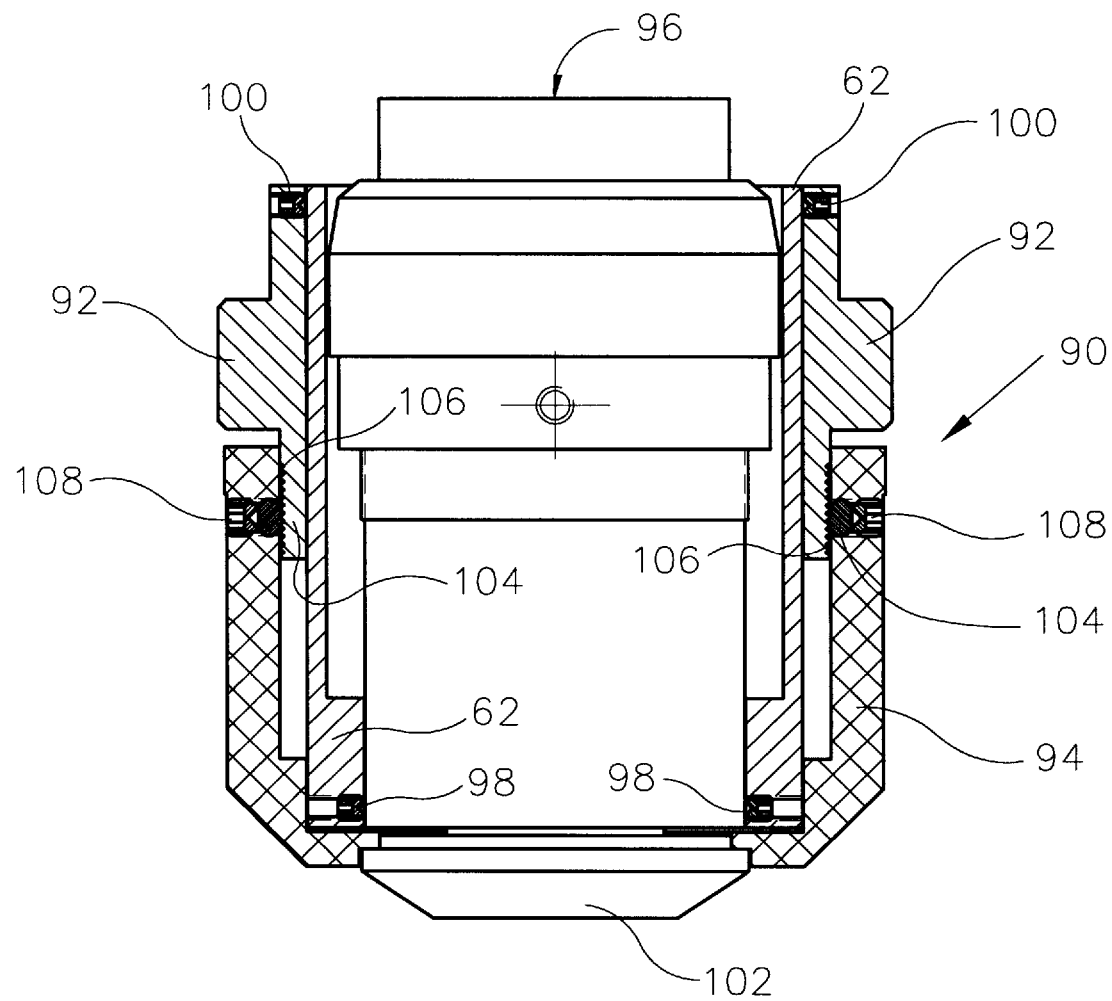
FIG. 6 is an assembly drawing of an interferometric objective according to the invention showing four plastic inserts utilized 90 degrees apart to provide a threaded connection between two concentric sleeves.

As would be obvious to those skilled in the art, the concept of the invention can be implemented in infinite equivalent configurations of thread and insert locations. For example, the inserts could be located on a single plane normal to the longitudinal (cylindrical) axis of the sleeves 12,16, which is preferred for optical applications that require a balanced support between the inner and outer sleeves. Alternatively, multiple inserts could be used distributed over different planes perpendicular to the cylindrical axis of the structure. Two inserts placed on diametrically opposite sides of the sleeves suffice to provide a balanced threaded connection between the two sleeves, but in practice they were found not to be sufficiently stiff and strong for many applications, is such cases allowing an axial misalignment between the two structures. I found that at least three equally spaced inserts (120 degrees apart), preferably on the same plane, provide adequate support for most optical microscope applications. Preferably, four inserts 90 degrees apart are utilized for additional axial support and stability, as illustrated in the assembly drawing of FIG. 6 (note that only two opposite inserts are seen in the figure, the other two being located at 90 degrees therefrom in both directions).

The invention has been described for convenience illustrating an interferometric objective in vertical position, which is a common arrangement for interferometric devices, but is obviously applicable in equivalent fashion to any threaded connection between coaxial cylindrical structures. Similarly, the invention is illustrated with preexisting male threads 20 and plastic inserts 26 utilized to form mating female threads 40, but the invention can be practiced as well with an opposite arrangement. Preexisting threads could be machined in the inner surface 18 of the female sleeve 16 and multiple inserts 26 could be mounted in openings 24 drilled radially in the male portion 12 which, of course, would be constructed without threads. This embodiment is not preferred because of the difficulty in reaching and adjusting set screws 28 from the inside out, but in principle it is equivalent to the embodiment illustrated in this disclosure.

It is also noted that the concept of the invention is equally applicable to produce a threaded connection between two surfaces that are not concentric. For example, the insert of the invention could be used to form a threaded surface in a fixed structure of any shape for mating with a pre-threaded rotating gear. Moreover, it is obvious that the choice of materials must be such that it is possible to deform the plastic insert by compressing it against the preexisting threads without damaging them. Thus, for example, while Teflon® inserts have been found to work well with aluminum, brass and steel threads, a suitably softer material would have to be used with preexisting threads made of synthetic polymer or other relatively pliable material.

As also well understood by one skilled in the art, the abutting, thread-forming surface 34 of the insert 26 must be sufficiently wide to overlap multiple machined threads 20 and produce a stable, strip-resistant engagement. For optical applications using aluminum/Teflon® or brass/Teflon® thread connections between sleeves with adjoining surfaces about 1.0 to 1.5 inches in diameter, about 10 overlapping threads were found to be sufficient.

Therefore, various changes in the details, steps and components that have been described may be made by those skilled in the art within the principles and scope of the invention herein illustrated and defined in the appended claims. While the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A method for producing a slidable threaded connection between two adjoining members comprising the following steps:

(a) providing a first member having a surface including first threads formed thereon;

(b) providing a second member having a non-threaded surface facing the threaded surface of said first member and having at least two openings bored therethrough substantially perpendicular to said non-threaded surface in the first member; and (c) compressing a plastic insert in each of said openings against said first threads to form second threads slidably mating therewith;

wherein step (c) is carried out while ensuring that said second threads formed in the plastic insert are not crushed by a pressure exercised thereon and retain sufficient structural integrity to support said first threads in the first member.

2. The method of claim 1, further comprising the step of partially releasing said pressure exercised on said insert after the second threads are formed.

3. The method of claim 1, further comprising the step of providing an adjustable set screw urging said insert against said first threads.

4. The method of claim 3, further comprising the step of partially releasing said pressure exercised by said set screw on said insert after the second threads are formed.

5. The method of claim 1, wherein said two adjoining members comprise two substantially-cylindrical concentric adjoining surfaces, a first surface thereof including said first threads and a second surface thereof having said at least two openings bored therethrough.

6. The method of claim 5, wherein said two adjoining members consist of an inner male sleeve and an outer female sleeve concentric therewith in an optical instrument.

7. The method of claim 6, wherein the inner male sleeve comprises said first surface and the outer female sleeve comprises said second surface.

8. The method of claim 7, comprising three of said at least two openings bored through the second surface.

9. The method of claim 7, comprising four of said at least two openings bored through the second surface.

10. The method of claim 9, wherein said first threads are made of aluminum or brass material and said second threads in the insert are made of polytetrafluoroethane material.

11. The method of claim 1, comprising three of said at least two openings bored through the second member.

12. The method of claim 11, further comprising an adjustable set screw urging said insert against said first threads.

* * * * *